Edward C. Blakeslee's Imp't in Machine for Threading Sheet Metal Screws

No. 116922

Patented Jul 11 1871

Edward C. Blakeslee, Inventor
By his Atty.

Witnesses:

UNITED STATES PATENT OFFICE.

EDWARD C. BLAKESLEE, OF WATERBURY, CONNECTICUT.

IMPROVEMENT IN MACHINES FOR THREADING SHEET-METAL SCREWS.

Specification forming part of Letters Patent No. 116,922, dated July 11, 1871.

*To all whom it may concern:*

Be it known that I, EDWARD C. BLAKESLEE, of Waterbury, in the county of New Haven and State of Connecticut, have invented a new Improvement in Machines for Threading Sheet-Metal Screws; and I do hereby declare the following, when taken in connection with the accompanying drawing and the letters of reference marked thereon, to be a full, clear, and exact description of the same, and which said drawing constitutes part of this specification, and represents, in—

Figure 1:
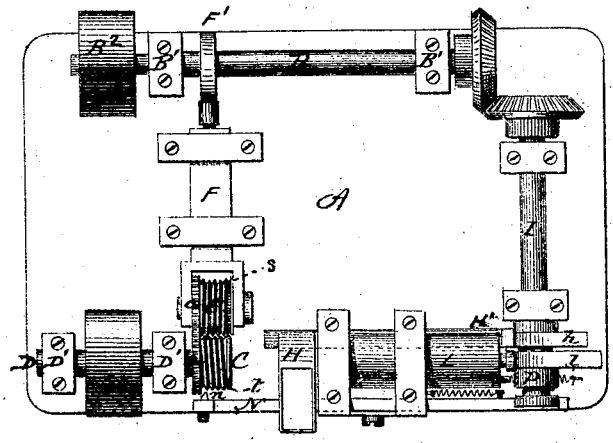
Figure 2:
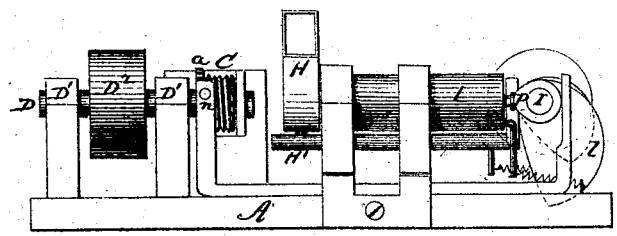

Figure 1, a top view; Fig. 2, a front view; and in Fig. 3, a central section, the hopper carried forward for delivery for the threading device.

This invention relates to an improvement in mechanism for threading sheet-metal screws, such as lanterns, fruit-jar tops, &c.; the object being to make the machine automatic to present the blanks and deliver the threaded screws; and it consists in combining, with common right-and-left-threading screws, a hopper to receive the blanks and present them to the screws, a follower to set the blanks onto the threading-screws, and also a device for edging the screws.

Figure 3:
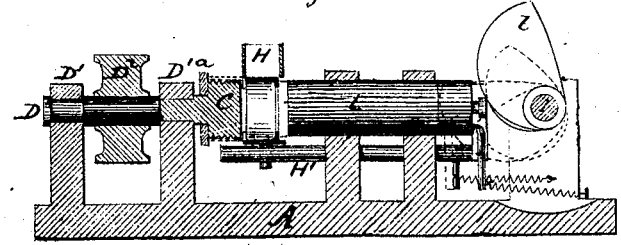

A is the bed-plate, upon which the operative mechanism is arranged. B is the driving-shaft, supported in suitable bearings B$^1$, and caused to revolve by the application of power through the pulley B$^2$, or otherwise. C is the internal threading-screw, fixed to the end of a shaft, D, supported in bearings D$^1$, and caused to revolve by the application of power through the pulley D$^2$ on the said shaft, or otherwise. E is the external threading-screw, arranged in a slide, F, and is moved to or from a threader, C, by means of the cam F$'$ on the shaft B. The two threaders, being geared together by pinions $a\ a$ and by the action of the cam F, separate sufficiently far to allow the blank to pass onto the threader C, and are moved forward to compress the metal into the thread of the screw C. The external threader E has, at its outer end, a groove, $s$, which is cut so as to form a knurled or milled surface upon the cylinder by working in conjunction with a corresponding reversed former, $t$, on the internal threader, as seen in Fig. 1. To make this operation automatic I arrange a hopper, H, on a sliding bar H$'$, which is actuated by a cam, $h$, on the counter-shaft I, geared to the driving-shaft B, as seen in Fig. 1. The action of this cam is to carry the hopper from the position in Fig. 2 to that in Fig. 3, close up to the threaders. An opening is formed through the hopper, in line with the threader C and larger than the blank, so as to allow the lowest blank to pass freely through the said opening onto the threader C. The hopper is supplied with a number of blanks to be threaded, the number depending upon the size of the hopper. This hopper may be carried forward onto the threader C, so as to leave the blank thereon when the hopper is removed; but I prefer to carry the hopper only to the threader, as seen in Fig. 3, then to transfer the blank from the hopper to the threader. I arrange a follower, L, in line therewith, and which, actuated by the cam $l$ on the shaft I, enters the hopper and presses the lowest blank from the hopper onto the threader, as denoted in broken lines, Fig. 3, the hopper and follower retreating to the position in Fig. 2. The blank is threaded by the combined action of the two threaders, as before described, and in this operation of threading runs off the threader C and is delivered complete from the machine. In many cases it is desirable to turn the edge of the blank slightly. To do this I arrange a tool, $n$, in a sliding bar N, which is actuated by a cam, P, so that as the blank is forced onto the threader the cam P draws the edging-tool $n$ against the edge of the metal, causing it to turn to give the desired finish to the edge.

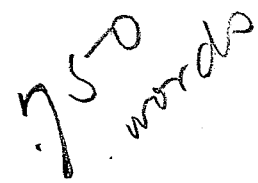

I claim as my invention—

1. In combination with the two threaders C E, the hopper H, plunger L, and mechanism to cause said hopper and plunger to move toward and from one of the threaders, as and for the purpose described.

2. In combination with the subject-matter of the first clause of the claim, the edging-tool $n$, arranged to operate in the manner and for the purpose substantially as set forth.

EDWARD C. BLAKESLEE.

Witnesses:
CHAS. N. GILLETTE,
CHARLES KEASEL.